(12) United States Patent
Satoh et al.

(10) Patent No.: US 6,331,501 B1
(45) Date of Patent: Dec. 18, 2001

(54) CATALYST FOR α-OLEFIN POLYMERIZATION AND PROCESS FOR PRODUCING α-OLEFIN POLYMER

(75) Inventors: Makoto Satoh, Ichihara; Yasuki Fujiwara, Ichikawa; Akio Imai, Narashino, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/250,286

(22) Filed: Feb. 16, 1999

(30) Foreign Application Priority Data

Feb. 19, 1998 (JP) .................................. 10-037586

(51) Int. Cl.⁷ .............................. B01J 31/00; B01J 37/00; C08F 4/02; C08F 4/60
(52) U.S. Cl. ........................ 502/128; 502/132; 502/133; 502/134; 502/110; 502/125; 502/126; 502/127
(58) Field of Search .................... 502/128, 132, 502/133, 134

(56) References Cited

U.S. PATENT DOCUMENTS 4,970,186    11/1990   Terano ..................... 502/125

FOREIGN PATENT DOCUMENTS

| 459009A | 12/1991 | (EP) . |
|---|---|---|
| 749984 | 12/1996 | (EP) . |
| 54148093 | 11/1979 | (JP) . |
| 55062907 | 5/1980 | (JP) . |
| 56047407 | 4/1981 | (JP) . |
| 62256802 | 11/1987 | (JP) . |
| 63235307 | 9/1988 | (JP) . |
| 03070711 | 3/1991 | (JP) . |
| 07216017 | 8/1995 | (JP) . |
| 08034814 | 2/1996 | (JP) . |
| 08231630 | 9/1996 | (JP) . |
| 09031119 | 2/1997 | (JP) . |

*Primary Examiner*—Mark L. Bell
*Assistant Examiner*—J. Pasterczyk
(74) *Attorney, Agent, or Firm*—Stevens Davis Miller & Mosher, L.L.P.

(57) ABSTRACT

A catalyst for α-olefin polymerization obtained by contacting (A) a solid catalyst component containing a titanium compound which is obtained by treating a solid product obtained by contacting an organosilicon compound having an Si—O bond, an ester compound and an organomagnesium compound, with an ether compound, titanium tetrachloride and an acyl halide, and successively treating said treated solid with an mixture of an ether compound and titanium tetrachloride, or a mixture of an ether compound, titanium tetrachloride and an ester compound, (B) an organoaluminum compound and (C) an electron-donative compound, and a process for producing an α-olefin polymer with the catalyst.

8 Claims, 1 Drawing Sheet

(A) Transition Metal Component
  Organosilicon compound having Si-O bond
  Ester compound
  Organomagnesium compound
  Titanium tetrachloride
  Ether compound
  Organic acid halide
  Ether compound
  Titanium tetrachloride
  (Ester compound)

(B) Organometallic Component
  Organoaluminum compound (C) Third Component
  Electron donative compound → Alpha-olefin Polymer

CATALYST FOR α-OLEFIN POLYMERIZATION AND PROCESS FOR PRODUCING α-OLEFIN POLYMER

BACKGROUND OF THE INVENTION

1. Field of the Invention

The present invention relates to a catalyst for α-olefin polymerization and a process for producing an α-olefin polymer. More specifically, the present invention relates to a catalyst for α-olefin polymerization which provides an α-olefin polymer having a high isotacticity, containing an extremely small amount of a catalyst residue and an amorphous polymer and being excellent in mechanical properties and a processability, at an extremely high catalytic activity based on a solid catalyst component and on titanium atom, and a process for producing an α-olefin polymer

2. Description of the Related Arts

It has been well known as a process for producing isotactic polymers of an α-olefin (e.g., propylene, 1-Butene) that so-called Ziegler-Natta catalyst comprising a solid catalyst component obtained by using a transition metal compound of Groups 4 to 6 of the Periodic Table and specific organometallic compounds.

When an α-olefin polymer is produced, an amorphous polymer is produced in addition to a highly stereoregular α-olefin polymer having a high value for industrial application. The amorphous polymer has a little value for industrial application and badly influences mechanical properties when the α-olefin polymer is molded to a shaped article, a film, a fiber or other fabricated articles to be used. Further, the by-production of the amorphous polymer causes a loss of a raw material monomer, and at the same time, equipment for removing the amorphous polymer is required, which causes a disadvantage from an industrial view point. Therefore, it is preferable that a catalyst used for producing an α-olefin polymer has no formation of such an amorphous polymer, or scarcely little even if formed.

Further, catalyst residues of the transition metal component and the organometallic component remain in the α-olefin polymer obtained. Equipment for removing the catalyst residues is required for removal and deactivation of the catalyst residues, because the catalyst residues may cause problems in various points such as the stability and processability of the α-olefin polymer and the like.

The problem can be improved by increasing the catalytic activity which is represented by the weight of the produced α-olefin polymer per unit weight of the catalyst, and the above-mentioned equipment for removing catalyst residues becomes unnecessary, and it can reduce the production cost of the α-olefin polymer.

It is known that a Ti—Mg complex-type solid catalyst which is obtained by reducing a tetravalent titanium compound with an organomagnesium compound in the presence of an organosilicon compound to form an eutectic crystal of magnesium and titanium, can realize α-olefin polymerization of relatively high stereoregularity and high activity by being used in combination with an organoaluminum compound as a co-catalyst and an organosilicon compound as a third component to the polymerization (Japanese Patent Publication (Examined) Hei No.3-43283 and Japanese Patent Publication (Unexamined) Hei No.1-319508).

It is disclosed that a polymerization giving higher stereoregularity and higher activity can be realized by the coexistence of an additional ester when a tetravalent titanium compound is reduced with an organomagnesium compound in the coexistence of an organosilicon compound, in the above-mentioned process (Japanese Patent Publication (Unexamined) Hei No.7-216017).

Further, it is known that a highly stereoregular α-olefin polymer can be produced at a high polymerization activity with a solid catalyst synthesized by treating a reaction product of an organomagnesium compound with an alcohol, with titanium tetrachloride, an alkoxy titanium compound and phthaloyl chloride and then repeating contact treatment with titanium tetrachloride 3 times (Japanese Patent Publication (Unexamined) Hei No.8-231630).

A process free from an extraction and deashing is at the possible level, but further improvement is desired. Specifically, it is desired that highly stereoregular polymerization is realized without sacrificing a particle size distribution and the like in order to make an α-olefin polymer of high quality. In particular, since a highly stereoregular polymer directly causes a quality of high rigidity in a use for an injection molding field in which a polymer of high rigidity is desired, the appearance of a catalyst having a capability for a polymerization of higher stereoregularity, has been desired.

Further, when a solid catalyst such as the Ziegler-Natta catalyst is used for industrial application, its particle shape and particle size distribution are very important for controlling the bulk density of a polymer, particle size and flowability. With respect of improving the particle shape and narrowing the particle size distribution, trials to overcome these problems have been carried out, using a solid catalyst prepared by supporting a titanium-magnesium compound on a silica gel in the polymerization of ethylene (Japanese Patent Publication (Unexamined) Show No.54-148098 and Japanese Patent Publication (Unexamined) Show No.56-47407).

It is disclosed in Japanese Patent Publication (Unexamined) Sho No.62-256802 that particle properties are markedly improved by using a solid catalyst obtained by impregnating a titanium-magnesium compound in silica gel, in the polymerization of propylene.

Although an improvement effect on particle shape is surely recognized according to these processes, it is not preferable from a quality viewpoint that a large amount of silica gel used as the carrier remains in the final products, which happens to cause fish eye in film use. Further, polymerization activity is also low and productivity cannot be satisfied. Accordingly, a solid catalyst component having an excellent catalyst shape and narrow particle size distribution and a polymerization capability of high activity and high stereoregularity is seriously desired.

SUMMARY OF THE INVENTION

An object of the present invention is to provide a process for producing a highly stereoregular α-olefin polymer containing little fine powder and having good powder properties, and a catalyst for α-olefin polymerization, capable of producing said α-olefin polymer at a high enough catalytic activity to make the removal of catalyst residues and an amorphous polymer unnecessary.

The present invention relates to a catalyst for α-olefin polymerization obtained by a process comprising contacting together:

(A) a solid catalyst component containing a titanium compound, which is obtained by treating a solid product obtained by contacting an organosilicon compound having an Si—O bond, an ester compound and an organomagnesium compound with an ether compound, titanium tetrachloride and an acyl halide, and successively treating said treated solid with a mixture of an ether compound and titanium tetrachloride, or a mixture of an ether compound, titanium tetrachloride and an ester compound;

(B) an organoaluminum compound; and (C) an electron-donative compound, and a process for producing an α-olefin polymer which comprises homopolymerizing an α-olefin, or copolymerizing an α-olefin with ethylene or another α-olefin with said catalyst.

DETAILED DESCRIPTION OF THE INVENTION

Figure 1:
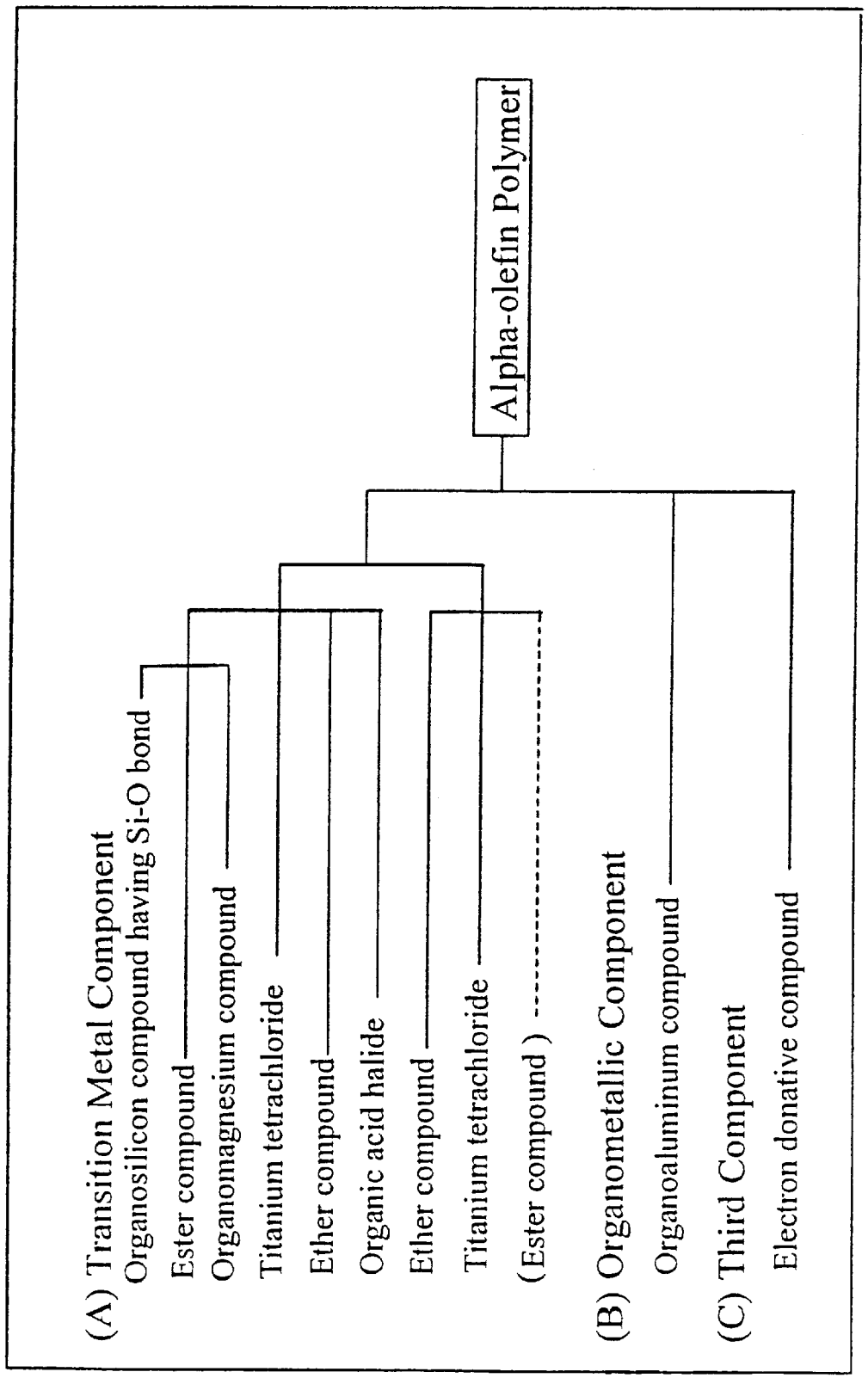
FIG. 1 shows a flow-chart for aiding an understanding of the present invention. The present flow-chart drawing is a typical example of mode of operation of the present invention, and the present invention is not limited thereto.

The present invention is specifically illustrated below.

(a) Organosilicon Compound having Si—O Bond

As the organosilicon compound having an Si—O bond which is used in the synthesis of the solid catalyst component of the present invention, for example, those represented by the general formulae described below can be used:

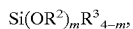

or

wherein $R^2$ is a hydrocarbon group having 1 to 20 carbon atoms, each of $R^3, R^4, R^5, R^6$ and $R^7$ is a hydrocarbon group having 1 to 20 carbon atoms or a hydrogen atom, m is a number satisfying an equation of $0<m\leq4$, p is an integer of 1 to 1000, and q is an integer of 2 to 1000.

Specified examples of the organosilicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, di-n-propoxydi-n-propylsilane, tetra-n-butoxysilane, di-n-butoxydi-n-butylsilane, dicyclopentoxydiethylsilane, diethoxydiphenylsilane, cyclohexyloxytrimethylsilane, phenoxytrimethylsilane, tratraphenoxysilane, triethoxyphenylsilane, hexamethyldisiloxane, hexaethyldisiloxane, hexa-n-propyldisiloxane, octaethyltrisiloxane, dimethylpolysiloxane, diphenylpolysiloxane, methylhydropolysiloxane, phenylhydropolysiloxane and the like.

Among these, alkoxysilanes represented by the general formula, $Si(OR^2)_mR^3_{4-m}$, are preferable, wherein m is preferably a number satisfying an equation of $1\leq m\leq4$ and in particular, tetraalkoxysilanes of which m is 4 are preferable.

(b) Ester Compound

As the ester compound used in the present invention, mono- and poly-valent carboxylic acid esters are used, and examples thereof include aliphatic carboxylic acid esters, alicyclic carboxylic acid esters and aromatic carboxylic acid esters. Specific examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, n-butyl benzoate, methyl toluate, ethyl toluate, ethyl anisate, diethyl succinate, di-n-butyl succinate, diethyl malonate, di-n-butyl malonate, dimethyl maleate, di-n-butyl maleate, diethyl itaconate, di-n-butyl itaconate, monoethyl phthalate, dimethyl phthalate, methylethyl phthalate, diethyl phthalate, di-n-propyl phthalate, diisopropyl phthalate, di-n-butyl phthalate, diisobutyl phthalate, di-n-octyl phthalate, diphenyl phthalate and the like. Among these esters, unsaturated aliphatic carboxylic acid esters such as methacrylates, maleates and the like, and aromatic dicarboxylic acid diesters are preferable and in particular, phthalic acid diesters are preferably used.

(c) Organomagnesium Compound

Any type of an organomagnesium compound having an Mg-carbon bond can be used as the organomagnesium compound used in the present invention. In particular, a Grignard compound represented by the general formula, $R^8MgX$, (wherein $R^8$ represents a hydrocarbon group having 1 to 20 carbon atoms, and X represents a halogen atom) or a dihydrocarbylmagnesium compound represented by the general formula, $R^9R^{10}Mg$, (wherein $R^9$ and $R^{10}$ represent a hydrocarbon group having 1 to 20 carbon atoms) is suitably used. Wherein $R^8$, $R^9$ and $R^{10}$ may be the same or different, and an alkyl group having 1 to 20 carbon atoms, an aryl group having up to 20 carbon atoms, an aralkyl group having up to 20 carbon atoms and an alkenyl group having up to 20 carbon atoms such as a methyl group, ethyl group, n-propyl group, isopropyl group, n-butyl group, sec-butyl group, n-amyl group, isoamyl group, n-hexyl group, n-octyl group, 2-ethyl-n-hexyl group, phenyl group, benzyl group and the like are exemplified.

Specific examples of the Grignard compound include methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, n-hexylmagnesium chloride, phenylmagnesium chloride, and phenylmagnesium bromide and the like. Specific examples of the compound represented by the general formula, $R^9R^{10}Mg$, include dimethylmagnesium, diethylmagnesium di-n-propylmagnesium, diisopropylmagnesium, di-n-butylmagnesium, di-sec-butylmagnesium, di-tert-butylmagnesium, butyl-sec-butylmagnesium, di-n-amylmagnesium, di-n-hexylmagnesium, diphenylmagnesium, butylethylmagnesium and the like.

As a solvent for the synthesis of the above-mentioned organomagnesium compound, an ether solvent such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetole, anisole, tetrahydrofuran, tetrahydropyran or the like is usually used. Further, a hydrocarbon solvent such as hexane, heptane, octane, cyclohexane, methylcyclohexane, benzene, toluene, xylene or the like, or a mixed solvent of the ether solvent and the hydrocarbon solvent is also used.

The organomagnesium compound in the present invention is preferably used in the form of an ether solution. As the ether compound in this case, an ether compound having six or more carbon atoms in its molecule and an ether compound having a cyclic structure is used. Further, it is preferable from the viewpoint of catalytic ability that the Grignard compound represented by the general formula, $R^8MGX$, is used in the form of an ether solution.

Moreover, a hydrocarbon-soluble complex of the above-mentioned organomagnesium compound with an organometallic compound can be also used. Examples of such organometallic compounds include organic compounds of Li, Be, B, Al or Zn.

(d) Ether Compound

The ether compounds used for treatment in the present invention include dialkyl ethers having two alkyl groups of 1 to 20 carbon atoms such as diethyl ether, di-n-propyl ether, diisopropyl ether, di-n-butyl ether, diisobutyl ether, di-n-amyl ether, diisoamyl ether, dineopentyl ether, di-n-hexyl ether, di-n-octyl ether, methyl-n-butyl ether, methylsioamyl ether, ethylisobutyl ether and the like. Among these, di-n-butyl ether or diisoamyl ether is preferably used.

(e) Acyl Halide Compound

As the acyl halide compound, Mono- and poly-valent carboxylic acid halides are used. Examples thereof include aliphatic carboxyl halides, alicyclic carboxyl halides and aromatic carboxyl halides. Specific examples include acetyl chloride, propionyl chloride butyroyl chloride, valeroyl chloride, acryloyl chloride, methacryloyl chloride, benzoyl chloride, toluyl chloride, anisyl chloride, succinyl chloride, malonyl chloride, maleyl chloride, itaconoyl chloride, phthaloyl chloride and the like. Among these organic acid halide compounds, aromatic carboxylic acid chlorides such as benzoyl chloride, toluyl chloride, phthaloyl chloride and the like are preferable, aromatic dicarboxylic acid dichlorides are more preferable, and phthaloyl chloride is more preferably used.

(f) Synthesis of Solid Catalyst Component

The solid catalyst component (A) in the present invention is obtained by: contacting an organosilicon compound having an Si—O bond, an ester compound and an organomagnesium compound to obtain a solid product; treating said solid product with an ether compound, titanium tetrachloride and an acyl halide to obtain a treated solid; and successively treating said treated solid with a mixture of an ether compound and titanium tetrachloride, or a mixture of an ether compound, titanium tetrachloride and an ester compound. All of these synthesis reactions are carried out under an atmosphere of an inert gas such as nitrogen, argon or the like.

As the method of contacting an organosilicon compound, an ester compound and an organomagnesium compound, any one of a method of adding the organomagnesium compound (c) to a mixture of the organosilicon compound (a) and the ester compound (b), or on the contrary, a method of adding a mixture of the organosilicon compound (a) and the ester compound (b) to the organomagnesium compound (c), or the like may be used. Among these, the method of adding the organomagnesium compound (c) to a mixture of the organosilicon compound (a) and the ester compound (b) is preferable from the viewpoint of the catalytic activity.

It is preferable that the organosilicon compound and/or the ester compound are dissolved in or diluted with an appropriate solvent to be used. Such solvent includes an aliphatic hydrocarbon such as hexane, heptane, octane, decane and the like, an aromatic hydrocarbon such as toluene, xylene and the like, an alicyclic hydrocarbon such as cyclohexane, methylcyclohexane, decalin and the like, and an ether compound such as diethyl ether, di-n-butyl ether, diisoamyl ether, tetrahydrofuran and the like.

The contacting temperature is usually in the range of about −50 to about 70° C., preferably in the range of about −30 to about 50° C., and more preferably in the range of about −25 to about 35° C. When the reaction temperature is too high, the catalytic activity deteriorates.

Further, a porous substance such as an inorganic oxide, an organic polymer or the like may coexist in the contact, so that the solid product can be impregnated in the porous substance. Such porous substance has preferably a pore volume of about 0.3 ml/g or more in the pore radius range of 20 to 200 nm and a mean particle diameter of 5 to 300 $\mu$m.

The porous inorganic oxides include $SiO_2$, $Al_2O_3$, MgO, $TiO_2$, $ZrO_2$, $SiO_2.Al_2O_3$ complex oxide, $MgO.Al_2O_3$ complex oxide, $MgO.SiO_2.Al_2O_3$ complex oxide and the like. The porous polymers include styrene-based polymers, acrylate-based polymers, acrylonitrile-based polymers, vinyl chloride-based polymers and olefin-based polymers represented by polystyrene, a styrene-divinylbenzene copolymer, a styrene-n,n'-alkylene dimethacrylamide copolymer, a styrene-ethylene glycol methyl dimethacrylate copolymer, a poly(ethylacrylate), methyl acrylate-divinylbenzene copolymer, an ethylacrylate-divinylbenzene copolymer, a poly(methylmethacrylate), a methylmethacrylate-divinylbenzene copolymer, a poly(ethylene glycol methyldimethacrylate), a polyacrylonitrile, a acrylonitrile-divinylbenzene copolymer, a poly(vinyl chloride), a poly(vinyl pyrrolidine), a poly(vinyl pyridine), an ethylvinylbenzene-divinylbenzene copolymer, polyethylene, an ethylene-methylacrylate copolymer, polypropylene and the like. Among these porous substances, $SiO_2$, $Al_2O_3$ and a styrene-divinylbenzene copolymer are preferably used.

The time of dropwise addition is not specifically restricted, but is usually about 30 minutes to about 12 hours. After completion of the addition, post-reaction may be further carried out at a temperature of about 20 to about 120° C.

The amount of the ester compound (b) used is generally in the range of (b)/Mg=0.001 to 1 in terms of a molar ratio of the ester compound to magnesium atom, preferably about 0.005 to about 0.6, and preferably about 0.01 to about 0.3 in particular. The amount of the magnesium compound (c) used is generally in the range of Si atom/Mg atom=0.1 to 10 in terms of an atomic ratio of silicon atom of the organosilicon compound having an Si—O bond to magnesium atom, preferably about 0.2 to about 5.0, and more preferably about 0.5 to about 2.0.

The solid product obtained by the reaction is usually separated from the solution and washed several times with an inert hydrocarbon solvent such as hexane, heptane or the like. The solid product thus obtained has a magnesium atom and a hydrocarbyloxy group, and usually shows non-crystallinity or extremely low crystallinity. In particular, the noncrystalline structure is preferable from the viewpoint of catalytic performance.

In the present invention, the solid product thus obtained is treated with the ether compound, titanium tetrachloride and the acyl halide compound. Wherein use of the organic acid halide compound decreases the amount of a cold xylene-soluble part which is an amorphous polymer having less industrial value. In addition, the polymerization activity and the bulk density of the polymer powder are simultaneously improved, and productivity are also improved.

As the method of the treatment, it is preferable to add a mixture of the ether compound and titanium tetrachloride to the above-mentioned solid product, successively add the organic acid halide compound followed by treating according to the present invention.

The amount of the ether compound used is usually about 0.008 to about 80 mmoles per 1 g of the above-mentioned solid product, preferably about 0.04 to about 40 mmoles, and more preferably about 0.08 to about 16 mmoles. The amount of titanium tetrachloride used is generally about 0.10 to about 900 mmoles per I g of the solid product, preferably about 0.3 to about 450 mmoles, and more preferably about 0.9 to about 270 mmoles. The amount of titanium tetrachloride used per 1 mole of the ether compound is usually about 1 to about 100 moles, preferable about 1.5 to about 75 moles, and more preferably about 2 to about 50 moles.

The amount of the acyl halide compound used is usually about 0.01 to about 1.0 mole per 1 mole of magnesium atom in the solid product, and preferably about 0.03 to about 0.5 moles. The use of the excess amount of the acyl halide compound sometimes causes the degradation of particles.

The treatment of the above-mentioned solid product with the ether compound, titanium tetrachloride and the organic acid halide compound can be conducted by any known method capable of bringing both into contact, for example, by a slurry method or by mechanical pulverization means such as a ball mill or the like. However, a slurry method capable of bringing both into contact in the presence of a diluent is preferable.

Examples of the diluent include an aliphatic hydrocarbon such as pentane, hexane, heptane, octane and the like, an aromatic hydrocarbon such as benzene, toluene, xylene and the like, an alicyclic hydrocarbon such as cyclohexane, cyclopentane and the like, a halogenated hydrocarbon such as 1,2-dichloroethane, monochlorobenzene and the like. Among these, in particular, an aromatic hydrocarbon or a halogenated hydrocarbon is preferable. The amount in volume of the diluent used is generally about 0.1 ml to about 1000 ml per 1 g of the solid product and preferably about 1 ml to about 100 ml. The treatment temperature is generally in the range of about −50 to about 150° C., preferably about 0 to about 120° C. and more preferably about 100 to about 120° C. The treatment time is generally 30 minutes or more, and preferably about 1 to about 10 hours. After completion of the treatment, the treated solid product is allowed to stand for solid separation from the liquid and washed several times with an inert hydrocarbon solvent to obtain an acyl halide-treated solid.

Then, the acyl halide-treated solid obtained is treated with either a mixture of the ether compound and titanium tetrachloride or a mixture of the ether compound, titanium tetrachloride and the ester compound.

The treatment is preferably carried out in a state of slurry. Available solvents for preparation of the slurry include an aliphatic hydrocarbon such as pentane, hexane, heptane, octane, decane and the like, an aromatic hydrocarbon such as toluene, xylene and the like, an alicyclic hydrocarbon such as cyclohexane, methylcyclohexane, decalin and the like, and a halogenated hydrocarbon such as dichloroethane, trichloroethylene, monochlorobenzene, dichlorobenzene, trichlorobenzene and the like. Among these solvents, the halogenated hydrocarbons or the aromatic hydrocarbons are preferable.

The concentration of the slurry is usually in the range of about 0.05 to about 0.7 (g-solid/ml-solvent) and preferably about 0.1 to about 0.5 (g-solid/ml-solvent). The treatment temperature is generally in the range of about 30 to about 150° C., preferably about 45 to about 135° C., and more preferably about 60 to about 120° C. The reaction time is not specifically limited but generally about 30 minutes to about 6 hours is suitable.

As the method of supplying the acyl halide-treated solid, the ether compound, titanium tetrachloride and an optional ester compound, any of either a process of adding the ether compound and titanium tetrachloride and the ester compound to the acyl halide-treated solid or, on the contrary, a process of adding the acyl halide-treated solid to a solution of the ether compound, titanium tetrachloride and the ester compound may be available.

In the method of adding the ether compound, titanium tetrachloride and the optional ester compound to the acyl halide-treated solid, a method of adding titanium tetrachloride after addition of the ether compound and the ester compound, or a method of adding the ether compound, titanium tetrachloride and the ester compound simultaneously is preferable. In particular, the method of adding a mixture of the ether compound, titanium tetrachloride and the optional ester compound previously prepared to the acyl halide-treated solid, is preferable.

Treatment of the acyl halide-treated solid with either a mixture of the ether compound and titanium tetrachloride or the treatment of a mixture of the ester compound, the ether compound and titanium tetrachloride may be carried out once or more repeatedly. It is preferable to repeat said treatment at least two times from the viewpoint of catalytic activity and stereoregularity.

The amount of the ether compound used is usually about 0.1 to about 100 moles per 1 mole of the titanium atom contained in the organic acid halide-treated solid, preferably about 0.5 to about 50 moles, and more preferable about 1 to about 20 moles. The amount of titanium tetrachloride used is usually about 1 to about 1000 moles per 1 mole of the titanium atom contained in the organic acid halide-treated solid, preferably about 3 to about 500 moles, and more preferably about 10 to about 300 moles. The amount of titanium tetrachloride added per 1 mole of the ether compound is generally about I to about 100 moles, preferably about 1.5 to about 75 moles, and more preferably about 2 to about 50 moles.

When the ester compound is used, the amount of the ester compound used is usually 30 moles or less per 1 mole of the titanium atom contained in the acyl halide-treated solid, preferably 15 moles or less, and more preferably 5 moles or less.

The solid catalyst component (A) obtained by the above-mentioned method is separated from the liquid and then washed several times with an inert hydrocarbon solvent such as hexane, heptane or the like to be used for polymerization. It is preferable from the viewpoint of the catalytic activity and stereoregularity to use the solid catalyst component for polymerization after washing the solid catalyst component separated from the liquid, once or more with a large amount of a halogenated hydrocarbon solvent such as monochlorobenzene or the like, or an aromatic hydrocarbon solvent such as toluene or the like, and subsequently several times with an aliphatic hydrocarbon solvent such as hexane or the like, at a temperature of 50 to 120° C.

A factor N in the particle size distribution function of Rosin-Rammler is usually known as an index representing the degree of particle size distribution of solid particles (refer to Rosin, P. and E. Rammler: J. Inst. Fuel, 7, p29 (1933) and Handbook of Chemical Engineering, 3rd. ed. pp. 361–362, published by Maruzen Ltd.).

$$R(Dp)=100 \exp\{-(Dp/De)^N\}$$

wherein R(Dp) represents a residual cumulative percentage distribution, and indicates a ratio of a cumulative amount of a particles-group larger than a particle diameter, Dp, to the total amount as a residual cumulative curve against the particle diameter, and De represents a particle diameter at R(Dp)=36.8%.

The larger N tends to narrow the particle size distribution. The solid catalyst component of the large N has a narrow particle size distribution and the polymer obtained has a high bulk density and thereby, is favorable in industry.

The solid catalyst component of the present invention obtained as described above is generally 3.0 or more in terms of the value of constant, N, in the particle size distribution function of Rosin-Rammler, and the particle size distribution is narrow. As the solid catalyst component of the present invention, the value of N is preferably 3.0 or more, more preferably about 3.2 or more, and most preferably about 3.4 or more.

(g) Organoaluminum Compound

The organoaluminum compound (B) used the present invention has at least one aluminum-carbon bond in its molecule. Typical examples thereof are indicated by the general formulae described below:

and

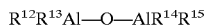

(wherein each of $R^{11}$ to $R^{15}$ represents a hydrocarbon group having 1 to 20 carbon atoms, Y represents a halogen atom, a hydrogen atom, or an alkoxy group having 1 to 20 carbon atoms, and γ is a number satisfying the equation of $2 \leq \gamma \leq 3$).

Specific examples of the organoaluminum compound include trialkylaluminums such as triethylaluminum, triisobutylaluminum, tri-n-hexylaluminum and the like, dialkylaluminum hydrides such as diethylaluminum hydride, diisobutylaluminum hydride and the like, dialkylaluminum halides such as diethylaluminum chloride and the like, mixtures of a trialkylaluminum and a dialkylaluminum halide such as a mixture of triethylaluminum and diethylaluminum chloride and the like, and alkylalumoxanes such as tetraethyldialumoxane, tetra-n-butyldialumoxane and the like.

Among these organoaluminum compounds, a trialkylaluminum, a mixture of a trialkylaluminum and a dialkylaluminum halide and an alkylalumoxanes are preferable. In particular, triethylaluminum, triisobutylaluminum, a mixture of triethylaluminum and diethylaluminum chloride, and tetraethyldialumoxane are preferable.

The amount of the organoaluminum compound used can be usually selected in the wide range of about 0.5 to about 1000 moles per 1 mole of the titanium atom in the solid catalyst component (A), but is preferably in the range of about 1 to about 600 moles in particular.

(h) Electron-donative Compound

Examples of the electron-donative compound (C) used during polymerization in the present invention include oxygen-containing electron donors such as alcohols, phenols, ketones, aldehydes, carboxylic acids, esters of organic acids or inorganic acids, ethers, acid amides, acid anhydrides and the like, and nitrogen-containing electron donors such as ammonias, amines, nitrites, isocyanates and the like. Among these electron donors, esters of an inorganic acid and ethers are preferably used.

The esters of an inorganic acid include preferably silicon compounds represented by the general formula, $R^{16}{}_n Si(OR^{17})_{4-n}$ (wherein $R^{16}$ is a hydrocarbon group having 1 to 20 carbon atoms or a hydrogen atom, $R^{17}$ is a hydrocarbon group having 1 to 20 carbon atoms, respective $R^{16}$ and $R^{17}$ may have different substituents in the same molecule, n is a number satisfying the equation of $0 \leq n < 4$). Specific examples thereof include tetramethoxysilane, tetraethoxysilane, tetrabutoxysilane, tetraphenoxysilane, methyltrimethoxysilane, ethyltrimethoxysilane, n-butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, di-n-propyldimethoxysilane, n-propylmethyldimethoxysilane, diisopropyldimethoxysilane, di-n-butyldimethoxysilane, diisobutyldimethoxysilane, di-tert-butyldimethoxysilane, n-butylmethyldimethoxysilane, n-butylethyldimethoxysilane, tert-butylmethyldimethoxysilane, isobutylisopropyldimethoxysilane, tert-butylisopropyldimethoxysilane, n-hexylmethyldimethoxysilane, n-hexylethyldimethoxysilane, n-dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclophexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, vinylmethyldimethoxysilane, methyltriethoxysilane, ethyltriethoxysilane, n-butyltriethoxysilane, isobutyltriethoxysilane, tert-butyltriethoxysilane, isopropyltriethoxysilane, cyclohexyltriethoxysilane, phenyltriethoxysilane, vinyltriethoxysilane, dimethyldiethoxysilane, diethyldiethoxysilane, di-n-propyldiethoxysilane, n-propylmethyldiethoxysilane, diisopropyldiethoxysilane, di-n-butyldiethoxysilane, diisobutyldiethoxysilane, di-tert-butyldiethoxysilane, n-butylmethyldiethoxysilane, n-butylethyldiethoxysilane, tert-butylmethyldiethoxysilane, n-hexylmethyldiethoxysilane, n-hexylethyldiethoxysilane, n-dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-tert-butoxysilane, 2-norbornanetrimethoxysilane, 2-norbornanetriethoxysilane, 2-norbornanemethyldimethoxysilane, trimethylphenoxysilane, methyltriallyloxysilane and the like.

The ethers include preferably di-alkyl ethers or diethers represented by the general formula:

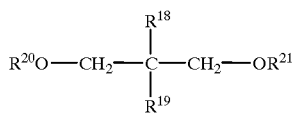

(wherein each of $R^{18}$ to $R^{21}$ represents a linear or branched alkyl group having 1 to 20 carbon atoms or an alicyclic hydrocarbon, aryl or aralkyl group having up to 20 carbon atoms, and $R^{18}$ or $R^{19}$ may be a hydrogen atom). Specific examples of the ether include diethyl ether, di-n-propyl ether, diisopropyl ether, di-n-butyl ether, di-n-amyl ether, diisoamyl ether, dineopentyl ether, di-n-hexyl ether, di-n-octyl ether, methyl-n-butyl ether, methylisoamyl ether, ethylisobutyl ether, 2,2-diisobutyl-1,3-dimethoxypropane, 2-isopropyl-2-isoamyl-1,3-dimethoxypropane, 2,2-bis(cyclohexylmethyl)-1,3-dimethoxypropane, 2-isopropyl-2-3,7-dimethyl-n-octyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-di-n-propyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl- 1,3-dimethoxypropane, 2- n-heptyl-2-n-amyl-1,3-dimethoxypropane and the like.

Among these electron-donative compounds, organosilicon compounds represented by the general formula of $R^{22}R^{23}Si(OR^{24})_2$ are preferably used in particular. Wherein in the general formula, $R^{22}$ is a hydrocarbon group having 3 to 20 carbon atoms in which the carbon atom adjacent to Si is secondary or tertiary. Specific examples of $R^{22}$ include branched alkyl groups such as an isopropyl group, sec-butyl group, tert-butyl group, tert-amyl group and the like, cycloalkyl groups such as a cyclopentyl group, cyclohexyl group and the like, cycloalkenyl groups such as cyclopentenyl group and the like, aryl groups such as a phenyl group, tolyl group and the like, etc. Further, wherein $R^{23}$ is a hydrocarbon group having 1 to 20 carbon atoms, and specific examples of $R^{23}$ include linear alkyl groups such as a methyl group, ethyl group, n-propyl group, n-butyl group, n-amyl group and the like, branched alkyl groups such as an isopropyl group, sec-butyl group, tert-butyl group, tert-amyl group and the like, cycloalkyl groups such as a cyclopentyl group, cyclohexyl group and the like, cycloalkenyl groups such as a cyclopentenyl group and the like, aryl groups such as a phenyl group, tolyl group and the like, etc. Further, wherein $R^{24}$ is a hydrocarbon group having 1 to 20 carbon atoms and preferably a hydrocarbon group having 1 to 5 carbon atoms.

Specific examples of the organosilicon compound used as such electron-donative compound include diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclopentyldimethoxysilane, cyclopentylisopropyldimethoxysilane, cyclopentyl-tert-butyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-butyldiethoxysilane, tert-amylmethyldiethoxysilane, tert-amylethyldiethoxysilane, tert-amyl-n-propyldiethoxysilane, tert-amyl-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanmethyldimethoxysilane and the like.

(i) Polymerization of Olefin

α-olefins applicable for the present invention are α-olefins having 3 or more carbon atoms, and preferably α-olefins having 3 to 10 carbon atoms. Specific examples thereof include linear monoolefins such as propylene, 1-butene, 1-pentene, 1-hexene, 1-heptene, 1-octene, 1-decene and the like, branched monoolefins such as 3-methyl-1-butene, 3-methyl-1-pentene, 4-methyl-1-pentene and the like, vinylcyclohexane and the like. These α-olefins may be used alone or in combinations of 2 or more kinds thereof.

Particularly, the catalyst of the present invention is preferably applicable to homopolymerization of propylene or 1-butene, or copolymerization of an olefin mixture including propylene or 1-butene as a main component, and more preferably to homopolymerization of propylene and copolymerization of an olefin mixture including propylene as a main component. And, a mixture of ethylene and two or more olefins selected from the above-mentioned α-olefins can be applied for the copolymerization in the present invention. Further, a compound having a plurality of unsaturated bond such as a conjugated diene and a non-conjugated diene, can be also used in the copolymerization. Hetero-block copolymerization, wherein polymerization is carried out in two or more stages, can be easily conducted.

The charging of the respective catalyst components to a polymerization vessel is not particularly restricted except that they should be supplied under a water-free condition in an inert gas such as nitrogen, argon or the like.

The solid catalyst component (A), the organoaluminum compound (B) and the electron-donative compound (C) may be charged independently, or alternatively any two of them may be mixed together prior to being charged.

In the present invention, polymerization of the olefin can be carried out in the presence of the fore-mentioned catalyst. The preliminary polymerization described below may be carried out prior to such a polymerization (main polymerization).

The preliminary polymerization is carried out by charging a small amount of an olefin in the presence of the solid catalyst component (A) and the organoaluminum compound (B), and is preferably carried out in the state of a slurry. The solvent used for preparation of the slurry includes an inert hydrocarbon such as propane, butane, isobutane, pentane, isopentane, hexane, heptane, octane, cyclohexane, benzene, toluene and the like. Further, a part or the whole of the inert hydrocarbon solvent used for preparation of a slurry may be replaced with a liquid olefin.

The amount of the organoaluminum compound used for the preliminary polymerization can be usually selected in a wide range of about 0.5 to about 700 moles per 1 mole of the titanium atom contained in the solid catalyst component, preferably about 0.8 to about 500 moles and more preferably about 1 to about 200 moles.

The amount of the olefin to be preliminarily polymerized is usually about 0.01 to about 1000 g per 1 g of the solid catalyst component, preferably about 0.05 to about 500 g and more preferably about 0.1 to about 200 g.

The concentration of slurry for the preliminary polymerization is preferably about 1 to about 500 g(solid catalyst component)/liter(solvent) and more preferably about 3 to about 300 g(solid catalyst component)/liter(solvent). The temperature of preliminary polymerization is preferably about −20 to about 100° C. and more preferably about 0 to about 80° C. The partial pressure of the olefin in the gas phase during the preliminary polymerization is preferably about 0.01 to about 20 kg/cm$^2$ and more preferably about 0.1 to about 10 kg/cm$^2$. However, this is not applied to the olefin which is liquid at a temperature under a pressure in the preliminary polymerization. The preliminary polymerization time is not specifically restricted, but is usually about 2 minutes to about 15 hours.

When the preliminary polymerization is carried out, as methods for charging the solid catalyst component (A), the organoaluminum compound (B) and the olefin, either of a method in which the olefin is fed after the solid catalyst component (A) has been contacted with the organoaluminum compound (B) or a method in which the organoaluminum compound (B) is fed after the solid catalyst component (A) has been contacted with the olefin may be used.

As a feeding method of the olefin, either a method of feeding the olefin in sequence while keeping the pressure so that the interior of a polymerization vessel becomes a predetermined pressure, or a method wherein the whole of the predetermined amount of the olefin is fed initially, may be used. A chain transfer agent such as hydrogen or the like, can be added in order to adjust the molecular weight of the polymer obtained.

The electron-donative compound (C) may coexist, if required, when a small amount of the olefin is preliminarily polymerized by the solid catalyst component (A) in the presence of the organoaluminum compound (B). A part or the whole of the electron-donative compound (C) described above may be used as the electron-donative compound here.

The amount of (C) used is usually about 0.01 to about 400 moles per 1 mole of the titanium atom contained in the solid catalyst component (A), preferably about 0.02 to about 200 moles, and more preferably about 0.03 to about 100, and is usually about 0.003 to about 5 moles per the organoaluminum compound (B), preferably about 0.005 to about 3 moles, and more preferably about 0.01 to about 2 moles. The method of feeding the electron-donative compound (C) for the preliminary polymerization is not specifically restricted. It may be separately fed from the organoaluminum compound (B) or may be fed after previously being contacted with the organoaluminum compound. Further, the olefin used in the preliminary polymerization may be the same as or different from the olefin to be used in the main polymerization.

After carrying out the preliminary polymerization described above, or without the preliminary polymerization, the main polymerization of the α-olefin can be carried out in the presence of the catalyst for α-olefin polymerization composed of the fore-mentioned solid catalyst component (A), the organoaluminum compound (B) and the electron-donative compound (C).

The amount of the organoaluminum compound used for main polymerization can be usually selected in a wide range of about 1 to about 1000 moles per 1 mole of the titanium atom in the solid catalyst component (A), and preferably about 5 to about 600 moles in particular.

The electron-donative compound (C) used in the main polymerization is usually about 0.1 to about 2000 moles per 1 mole of the titanium atom contained in the solid catalyst component (A), preferably about 0.3 to about 1000 moles, and more preferably about 0.5 to about 800 moles, and is usually about 0.001 to about 5 moles per the organoaluminum compound, preferably about 0.005 to about 3 moles, and more preferably about 0.01 to about 1 mole.

The main polymerization can be usually carried out at a temperature within a range of about −30 to about 300° C. and preferably about 20 to about 180° C. The polymerization pressure is not specifically restricted, but a pressure of about normal pressure to about 100 kg/cm$^2$ and preferably about 2 to about 50 kg/cm$^2$ is usually adopted from the industrial and economical viewpoints. The polymerization can be carried out batchwise or continuously. Slurry polymerization or solution polymerization using an inert hydrocarbon solvent such as propane, butane, isobutane, pentane, hexane, heptane, octane or the like, bulk polymerization using, as a medium, an olefin which is liquid at the polymerization temperature, or gas phase polymerization, is applicable.

In the main polymerization, a chain transfer agent such as hydrogen or the like can be added in order to adjust the molecular weight of the polymer produced.

EXAMPLE

The present invention will be illustrated in more detail by Examples and Comparative Examples below, but is not particularly limited thereto. Evaluation methods for the various properties of polymers in the Examples are as follows.

(1) Xylene-soluble Portion at 20° C. (hereinafter, referred to as "CXS"):

After dissolving 1 g of polymer powders in 200 ml of boiled xylene, the solution is cooled to 50° C., further cooled in iced water with stirring to 20° C., is allowed to stand at 20° C. for 3 hours, and a polymer precipitated is filtered out. The filtrate is evaporated for removal of the xylene. The residue is dried under reduced pressure at 60° C. to recover the polymer soluble in 20° C. xylene and weigh it. The weight percentage of the polymer soluble in xylene at 20° C. to the whole polymer is calculated (% by weight). The smaller CXS indicates less amorphous polymer and higher stereoregularity.

(2) Intrinsic Viscosity (hereinafter, referred to as [η]):

The Intrinsic viscosity was measured in tetralin solvent at 135° C. with an Ubbelohde viscometer.

(3) N in Rosin-Rammler Function:

The particle size distribution was measured with an ultra centrifugal-type automatic particle size distribution analyzer CAPA-700 (manufactured by Horiba Ltd.). Then, the data obtained were applied to the Rosin-Rammler function (refer to P. Rosin and E. Rammler: J. Inst. Fuel, 7, p29(1933) and Handbook of Chemical Engineering, 3rd. ed. pp. 361–362, published by Maruzen Ltd.) described below, to determine the particle size distribution:

$$R(Dp)=100\exp\{-(Dp/De)^N\}$$

wherein R(Dp) is a distribution of residual ratio and is shown as a residual ratio curve, which shows the ratio of the total weight of larger particles than a predetermined particle diameter Dp to the whole weight plotted against the particle diameter, and De represents a particle diameter at R(Dp)= 36.8%. A larger N tends to narrow the distribution. A solid catalyst component having a large N has a narrow particle size distribution, and a polymer obtained has a high bulk density and is preferable in industry.

Example 1

(a) Synthesis of Solid Product

The atmosphere in a 500 ml-flask equipped with a stirrer and a dropping funnel was replaced with nitrogen, and 270 ml of hexane, 2.5 ml (2.5 g: 7.34 mmol) of diisobutyl phthalate, and 73.5 ml (68.6 g: 329 mmol) of tetraethoxysilane were charged in the flask to obtain a homogeneous solution. Then, 170 ml of a di-n-butyl ether solution of n-butylmagnesium chloride (manufactured by Yukigosei Yakuhin K.K., concentration of n-butylmagnesium chloride: 2.1 mmol/ml) was slowly added dropwise from the dropping funnel over 3 hours, while the temperature in the flask was kept at 5° C. After the dropwise addition, the solution was further stirred at 5° C. for one hour and at room temperature for an additional one hour. Then, the resulted mixture was subjected to solid-liquid separation to obtain a solid. The solid was washed three times with 185 ml of toluene to obtain a solid product. Then, 205 ml of toluene was added to the solid product to prepare a slurry having a concentration of 0.142 g/ml. A part of the slurry was sampled, and the solid product in the slurry was subjected to composition analysis. No phthalic acid ester was detected, and the solid product contained 33.4% by weight of ethoxy group and 0.54% by weight of butoxy group.

(b) Synthesis of Solid Catalyst Component

The atmosphere in a 100 ml-flask equipped with a stirrer, a dropping funnel and a thermometer was replaced with nitrogen. After 55.1 ml of the slurry containing the solid product obtained in the above-mentioned (a) was charged, the slurry was dried. 19.6 ml of toluene was added, a mixture of 0.78 ml (6.3 mmol) of di-n-butyl ether and 15.7 ml (0.143 mole) of titanium tetrachloride was added, and subsequently 1.57 ml (10.9 mmol: 0.20 ml/lg of solid product) of phthaloyl chloride was added to the slurry. The slurry was heated to 115° C. and stirred for three hours. After completion, the reaction mixture was subjected to solid-liquid separation at the same temperature to obtain a solid. The obtained solid was washed twice with 39 ml of toluene at the same temperature. Then, a mixture of 9.8 ml of toluene, 0.44 ml (1.64 mmol) of diisobutyl phthalate, 0.78 ml (6.3 mmol) of di-n-butyl ether and 7.8 ml (0.071 mole) of titanium tetrachloride was added to the solid for treatment, and the solid was treated for one hour at 115° C. After completion of the treatment, the resulted mixture was subjected to solid-liquid separation at the same temperature to obtain a first treated solid. The treated solid was washed twice with 39 ml of toluene at the same temperature. Then, a mixture of 9.8 ml of toluene, 0.78 ml (6.3 mmol) of di-n-butyl ether and 7.8 ml (0.071 mole) of titanium tetrachloride was added to the first treated solid, and the solid was treated for one-hour at 115° C. Then, the resulting mixture was subjected to solid-liquid separation at the same temperature to obtain a second treated solid, That was separated from the slurry at the same temperature. The second treated solid was washed twice with 39 ml of toluene at the same temperature. Then, a mixture of 9.8 ml of toluene, 0.78 ml (6.3 mmol) of di-n-butyl ether and 7.8 ml (0.071 mole) of titanium tetrachloride was added to the second treated solid, and the resulted mixture was treated for one-hour at 115° C. After completion of the treatment, the resulted mixture was subjected to solid-liquid separation at the same temperature to obtain a third treated solid. The third treated solid was washed three times with 39 ml of toluene at the same temperature, washed three times with 39 ml of hexane, and further dried under reduced pressure to obtain 6.90 g of a solid catalyst component.

The solid catalyst component contained 1.58% by weight of titanium atom, 8.81% by weight of phthalate, 0.1% by weight of ethoxy group and 0.1% by weight of butoxy group.

(c) Polymerization of Propylene

The atmosphere of a stirring-type stainless steel autoclave of 3 liter was replaced with argon, 2.6 mmol of triethylaluminum, 0.26 mmol of cyclohexylethyldimethoxysilane and 6.6 mg of the solid catalyst component synthesized in (b) were charged into the autoclave, and hydrogen corresponding to a partial pressure of 0.33 kg/cm$^2$ was introduced thereto. Then, after charging 780 g of liquid propylene, the autoclave was heated to a temperature of 80° C. and polymerization was carried out at 80° C. for one hour. After completion of the polymerization, the unreacted monomer was purged out. The obtained polymer was dried under reduced pressure at 60° C. for two hours, so as to obtain 407 g of polypropylene powders.

The yield (hereinafter, referred to as PP/Cat) of polypropylene(g) per 1 g of the solid catalyst component was 61700 (g/g). The ratio of a 20° C. xylene-soluble component contained in the whole polymer (CXS) was 0.37(% by weight), the intrinsic viscosity of the polymer [η] was 2.10, and the bulk density was 0.385 g/ml. Conditions and results of polymerization are shown in Table 1.

Comparative Example 1

(a) Synthesis of Reduced Solid Product

The reaction was carried out in the same manner as in (a) of Example 1 except that the amounts of reagents used were 2.5 ml (2.6 g: 9.3 mmol) of diisobutyl phthalate, 78.0 ml (72.9 g: 349.7 mmol) of tetraethoxysilane, and 181 ml of the solution of n-butylmagnesium chloride. The solid product obtained separated from the solution was washed three times with 300 ml of toluene, and 155 ml of toluene was then added to the washed solid product to form a slurry of a concentration of 0.172 g/ml.

A part of the solid product slurry was sampled, and composition analysis of the solid product was carried out. No phthalic acid ester was detected and the solid product contained 32.6% by weight of ethoxy group and 0.42% by weight of butoxy group.

(b) Synthesis of Solid Catalyst Component

After the atmosphere in a 200 ml-flask equipped with a stirrer, a dropping funnel and a thermometer, was replaced with argon, 29 ml of the solid product-containing slurry obtained in the above-mentioned (a) was charged into the flask, 3.35 ml (12.5 mmol) of diisobutyl phthalate was added, and the reaction was carried out at 105° C. for 30 minutes. After the reaction, a reaction mixture was subjected to solid-liquid separation to obtain a ester-treated solid, and the ester-treated solid was washed twice with 25 ml of toluene.

Then, a mixture of 7.0 ml of toluene, 0.28 ml (1.1 mmol) of diisobutyl phthalate, 0.5 ml (4.0 mmol) of di-n-butyl ether and 8.0 ml (73.0 mmol) of titanium tetrachloride was added in the flask and the mixture was treated at 105° C. for 3 hours. After completion of the treatment, the resulting mixture was subjected to solid-liquid separation to obtain a treated solid. The treated solid was washed twice with 25 ml of toluene at the same temperature. Then, a mixture of 7.0 ml of toluene, 0.5 ml (4.0 mmol) of di-n-butyl ether, and 4.0 ml (36.5 mmol) of titanium tetrachloride was added to the treated solid, and the resulting mixture was treated at 105° C. for 1 hour. After completion of the treatment, the resulting mixture was subjected to solid-liquid separation to obtain a second treated solid. The second treated solid was washed 3 times with 25 ml of toluene at the same temperature, successively three times with 25 ml of hexane, and dried under reduced pressure to obtain 4.6 g of a solid catalyst component. The solid catalyst component contained 1.67% by weight of titanium atom, 9.10% by weight of a phthalic acid ester, 0.65% by weight of ethoxy group, and 0.14% by weight of butoxy group.

(c) Polymerization of Propylene

Propylene was polymerized in the same manner as in the polymerization of propylene in (c) of Example 1, except that 4.0 mg of the solid catalyst component obtained in the above-mentioned (b) was used.

As the results of polymerization, the PP/Cat was lower being 42200 (g/g), than that in Example 1, and the stereoregularity of the polymer obtained was lower being 0.74% by weight in terms of CXS than that of Example 1. The bulk density was 0.395 g/ml, and [η] was 1.82 (dl/g). Conditions and results of polymerization are shown in Table 1.

Comparative Example 2

(a) Synthesis of Solid Catalyst Component

After the atmosphere in a 100 ml flask equipped with a stirrer, a dropping funnel and a thermometer was replaced with argon, 50 ml of the solid product-containing slurry prepared in (a) of Example 1 was charged therein, 8.8 ml of the supernatant liquid was taken from the slurry, and 1.42 ml (9.86 mmol) of phthaloyl chloride was added, and the reaction was carried out at 110° C. for 30 minutes. After the reaction, the resulted mixture was subjected to solid-liquid separation to obtain a treated solid, and the treated solid was washed twice with 36 ml of toluene. Then, a mixture of 9.0 ml of toluene, 0.40 ml (1.5 mmol) of diisobutyl phthalate, 0.71 ml (5.7 mmol) of di-n-butyl ether and 14.2 ml (0.129 mol) of titanium tetrachloride was added to the flask, and the reaction was carried out at 115° C. for three hours. After completion of the reaction, the resulting mixture of solids was subjected to solid-liquid separation at the same temperature to obtain a first treated solid, and the first treated solid was washed twice with 36 ml of toluene at the same temperature. Then, a mixture of 9 ml of toluene, 0.71 ml (5.7 mmol) of di-n-butyl ether and 7.1 ml (0.065 mol) of titanium tetrachloride was added to the first treated solid and the reaction was carried out at 115° C. for one hour. After completion of the reaction, the reaction mixture was subjected to solid-liquid separation at the same temperature. The separated solid was washed three times with 36 ml of toluene at the same temperature, subsequently three times with 36 ml of hexane, and further dried under reduced pressure to obtain 5.74 g of a solid catalyst component.

The solid catalyst component contained 0.99% by weight of titanium atom, 7.30% by weight of a phthalic acid ester, 1.95% by weight of ethoxy group, and 0.20% by weight of butoxy group.

(b) Polymerization of Propylene

Propylene was polymerized in the same manner as in the polymerization of propylene in (c) of Example 1, except that 4.9 mg of the solid catalyst component obtained in the above-mentioned (a) was used.

The results of polymerization shows a low polymerization activity of PP/Cat of 5820 (g/g) and a low stereoregularity of 1.2% by weight in terms of CXS. Further, the bulk density was 0.362 g/ml, and [η] was 1.72 (dl/g). The conditions and results of the polymerization are shown in Table 1.

Comparative Example 3

(a) Synthesis of Solid Component

The atmosphere in a 500 ml flask equipped with a stirrer and a dropping funnel was replaced with nitrogen, and 130 ml of di-n-butyl ether, 70.7 ml of a di-n-butyl ether solution of n-butylmagnesium chloride (manufactured by Yukigosei Yakuhin K.K., concentration of n-butylmagnesium chloride: 2.1 mmol/ml) were charged therein to obtain a homogeneous solution. Then, a mixed solution of 60 ml of a di-n-butyl ether solution and 8.7 ml of ethanol was slowly added dropwise from the dropping funnel over 1.25 hours, while the temperature in the flask was kept at 5° C. After completion of the dropwise addition, the solution was further stirred at 5° C. for 30 minutes, successively heated to 75° C., and stirred at the same temperature for 30 minutes. Then, the resulted mixture was left alone, a produced solid was separated from the mixture, washed twice with 200 ml of hexane, and then dried under vacuum to obtain 17.35 g of a solid product.

(b) Synthesis of Solid Catalyst Component

The atmosphere in a 300 ml flask equipped with a stirrer, a dropping funnel and a thermometer was replaced with nitrogen. After 10.32 g of the solid product obtained in the above-mentioned (a) was charged, 62.0 ml of toluene and 41.3 ml (0.380 mol) of titanium tetrachloride were charged and the mixture was heated to 70° C. Then, 1.55 ml (4.55 mmol) of tetra-n-butoxy titanium and 2.06 ml (14.3 mmol: 0.20 ml/1 g of solid product) of phthaloyl chloride were added, and the mixture was heated to 115° C. and stirred for 2 hours as it was. After completion of the reaction, the supernatant liquid was taken out at the same temperature by a decantation method, and then the residue was washed twice with 200 ml of toluene at the same temperature by the same method. Then, a mixture of 62.0 ml of toluene and 41.3 ml (0.377 mol) of titanium tetrachloride was added, and the mixture was treated at 115° C. for two hours. After completion of the reaction, the supernatant liquid was taken out at the same temperature by a decantation method, and the residue was washed twice with 200 ml of toluene at the same temperature by the same method. Then, 62.0 ml of toluene and 41.3 ml (0.377 mol) of titanium tetrachloride were added, and the mixture was treated at 115° C. for two hours. After completion of the reaction, the supernatant liquid was taken out at the same temperature by a decantation method, the residue was washed twice with 200 ml of toluene at the same temperature by the same method, washed ten times with 200 ml of hexane and dried under reduced pressure to obtain 8.19 g of a solid catalyst component.

The solid catalyst component contained 1.32% by weight of titanium atom, 4.19% by weight of a phthalic acid ester, and 0.1% by weight of ethoxy group.

(c) Polymerization of Propylene

Propylene was polymerized in the same manner as in the polymerization of propylene in (c) of Example 1, except that the solid catalyst component obtained in the above-mentioned (b) was used.

As the result of polymerization, the PP/Cat was low, being 46600 (g/g). The CXS of the polymer was 0.87 (% by weight), the bulk density was 0.314 g/ml, and [η] was 2.14(dl/g). Conditions and results of polymerization are shown in Table 1.

TABLE 1

| | | | Polymerization results | | | |
|---|---|---|---|---|---|---|
| | N | Electron donative compound | PP/Cat (g/g) | CXS (wt %) | [η] (dl/g) | Bulk Density (g/ml) |
| Example 1 | 3.54 | cHEDMS | 61700 | 0.37 | 2.10 | 0.385 |
| Comparative Example 1 | 2.20 | cHEDMS | 42200 | 0.74 | 1.82 | 0.395 |
| Comparative Example 2 | 4.64 | cHEDMS | 5820 | 1.2 | 1.72 | 0.362 |
| Comparative Example 3 | 1.51 | cHEDMS | 46600 | 0.87 | 2.14 | 0.314 | cHEDMS: cyclohexylethyldimethoxysilane

According to the present invention, a catalyst for α-olefin polymerization which is excellent in particle size distribution and has a high catalytic activity, which is enough to make the removal of catalyst residues and an amorphous polymer unnecessary, and stereoregularity, and a process for producing a highly stereoregular α-olefin polymer of high quality are provided.

What is claimed is:

1. A catalyst for α-olefin polymerization obtained by a process comprising contacting together:
   (A) a solid catalyst component containing a titanium compound which is obtained by treating a solid product obtained by contacting an organosilicon compound having an Si—O bond, an ester compound and an organomagnesium compound, with an ether compound, titanium tetrachloride and an acyl halide, and successively treating said treated solid with a mixture of an ether compound a titanium tetrachloride, or a mixture of an ether compound, titanium tetrachloride and an ester compound;
   (B) an organoaluminum compound; and
   (C) an electron-donative compound.

2. A catalyst for α-olefin polymerization according to claim 1, wherein the solid catalyst component (A) possesses a particle size distribution of 3.0 or more in terms of the value of N in a Rosin-Rammler function of particle size distribution by the equation:

$$R(Dp)=100\exp\{-(Dp/De)^N\}$$

wherein R(Dp) represents a residual cumulative percentage distribution, and indicates a ratio of a cumulative amount of a particles-group larger than a particle diameter, Dp, to the total amount as a residual cumulative curve against the particle diameter, and De represents a particle diameter at R(Dp)=36.8%.

3. A catalyst for α-olefin polymerization according to claim 1, wherein the organosilicon compound having an Si—O bond is represented by the general formulae:

$$Si(OR^2)_m R^3_{4-m},$$

$$R^4(R^5_2 SiO)_p R^6_3,$$

or $$(R^7_2 SiO)_q,$$

wherein $R^2$ is a hydrocarbon group having 1 to 20 carbon atoms, each of $R^3$, $R^4$, $R^5$, $R^6$ and $R^7$ is a hydrocarbon group having 1 to 20 carbon atoms or a hydrogen atom, m is a number satisfying the equation of $0<m\leq 4$, p is an integer of 1 to 1000, and q is an integer of 2 to 1000.

4. A catalyst for α-olefin polymerization according to claim 1, wherein the ester compound used together with the silicon compound and the organomagnesium compound is a member selected from the group consisting of aliphatic carboxylic acid esters, alicyclic carboxylic acid esters and aromatic carboxylic acid esters.

5. A catalyst for α-olefin polymerization according to claim 1, wherein the ester compound used together with the ether compound and titanium tetrachloride is a member selected from the group consisting of aliphatic carboxylic acid esters, alicyclic carboxylic acid esters and aromatic carboxylic acid esters.

6. A catalyst for α-olefin polymerization according to claim 1, wherein each ether compound is a dialkyl ether having two alkyl groups of 1 to 20 carbon atoms.

7. A catalyst for α-olefin polymerization according to claim 1, wherein each ether compound is a member selected from the group consisting of diethyl ether, di-n-propyl ether, diisopropyl ether, di-n-butyl ether, diisobutyl ether, di-n-amyl ether, diisoamyl ether, dineopentyl ether, di-n-hexyl ether, di-n-octyl ether, methyl-n-butyl ether, methylisoamyl ether, and ethylisobutyl ether.

8. A catalyst for α-olefin polymerization according to claim 1, wherein the acyl halide compound is a member selected from the group consisting of aliphatic carboxyl halides, alicyclic carboxyl halides and aromatic carboxyl halides.

* * * * *